United States Patent [19]
Gavitt, Sr.

[11] 3,801,845
[45] Apr. 2, 1974

[54] ROTATIONAL CHARACTERISTICS SENSING AND SIGNAL GENERATING MECHANISM AND A MAGNETIC FIELD INTERRUPTER THEREFOR

[75] Inventor: Willis A. Gavitt, Sr., Ionia, Mich.

[73] Assignee: General Motors Corporation, Detroit, Mich.

[22] Filed: July 13, 1972

[21] Appl. No.: 271,249

[52] U.S. Cl. .............................................. 310/168
[51] Int. Cl. ........................................ H02k 19/24
[58] Field of Search ............ 310/70, 168, 169, 170, 310/75, 75 D; 303/20

[56] References Cited
UNITED STATES PATENTS

| | | | |
|---|---|---|---|
| 3,626,228 | 12/1971 | Jordan | 310/168 |
| 3,549,925 | 12/1970 | Johnson | 310/168 |
| 3,551,712 | 12/1970 | Jones | 310/168 |
| 3,626,223 | 12/1971 | Maier | 310/168 |
| 3,694,661 | 9/1972 | Minova | 310/168 |
| 3,573,520 | 4/1971 | Dorshimer | 310/168 |

Primary Examiner—R. Skudy
Attorney, Agent, or Firm—D. D. McGraw

[57] ABSTRACT

A vehicle wheel hub is provided with a frusto-conical end surface having a shoulder adjacent the smaller circumferential side. A magnetic field probe is mounted in radially spaced relation to the frusto-conical surface, and an elastic garter member made of a magnetic field modifying material is positioned on the frusto-conical surface. The garter member has a plurality of raised surfaces which, when rotating with the hub relative to the probe, interrupts the magnetic field sensed by the probe so that signals which reflect the rotational characteristics of the hub are generated in the probe. The signals may be related to hub rotational velocity or hub acceleration characteristics, for example.

1 Claim, 3 Drawing Figures

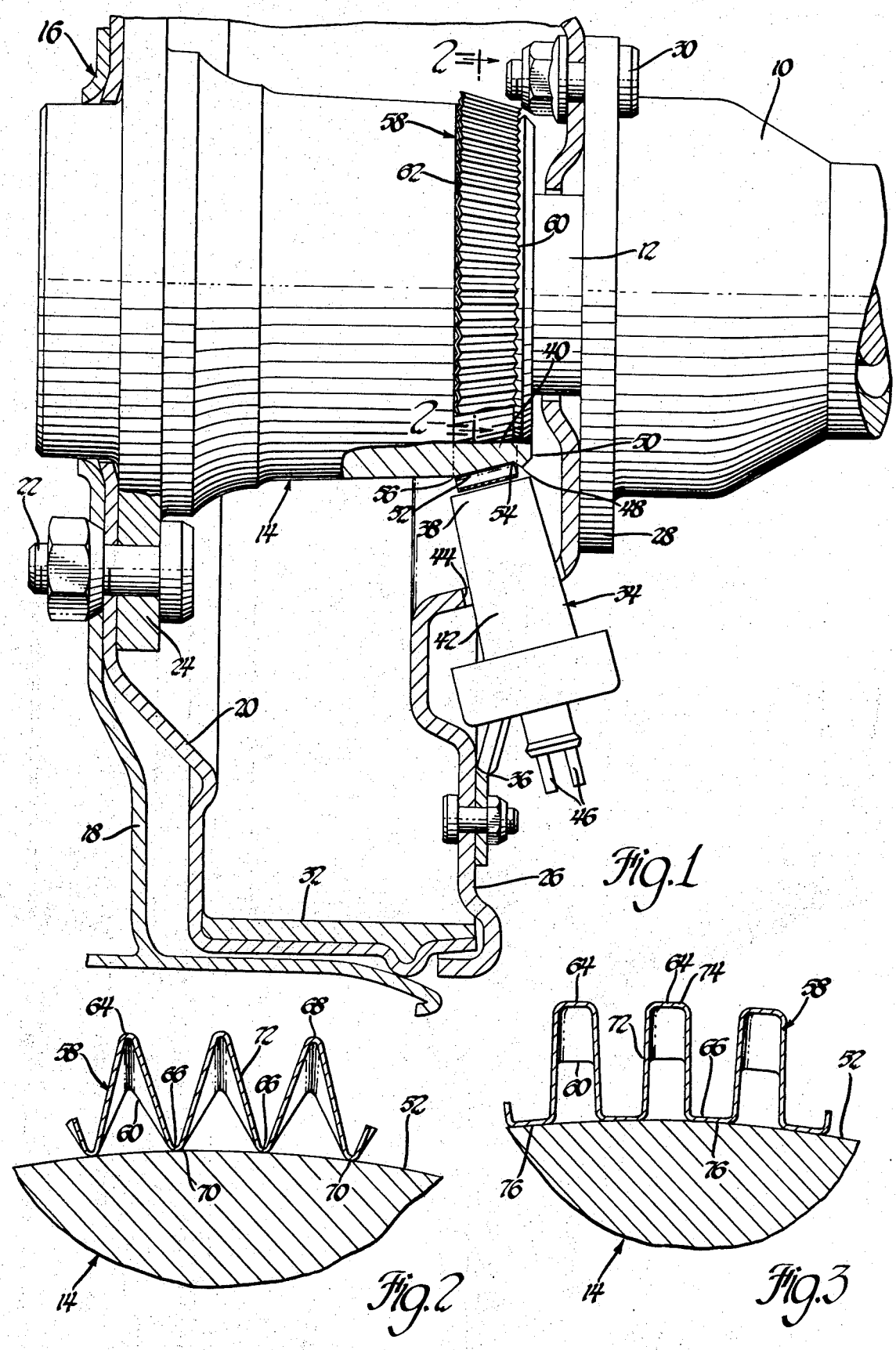

ROTATIONAL CHARACTERISTICS SENSING AND SIGNAL GENERATING MECHANISM AND A MAGNETIC FIELD INTERRUPTER THEREFOR

The invention relates to a magnetic field interrupter and to a rotational characteristics signal generating mechanism of which the magnetic field interrupter is a part. In many systems it is required to determine certain rotational characteristics of a rotatable element and to develop signal reflecting these characteristics in order to control the rotation of the rotatable element and/or other elements to which the system is connected. A typical example of such a system is a wheel lock control in which the velocity or acceleration characteristics of a vehicle wheel are sensed and corresponding signals are generated so that the brake for the wheel is in turn controlled to prevent the wheel from locking during heavy braking. Such systems are well known in the art and are exemplified by that disclosed in U.S. Pat. No. 3,554,612. One of the more common mechanisms utilized to develop the necessary rotational characteristics signals is a magnetic field probe mounted with its sensing head closely spaced from teeth-like elements provided on a suitable part of the rotatable wheel assembly. The teeth-like elements are usually provided as a gear, the teeth being machined, stamped, or cast as a part of the wheel hub or a separate disc, attached to the rotatable wheel in such a manner that the teeth interrupt the magnetic field sensed by the probe as the wheel rotates. Such a device is exemplified by that found in the disclosure of U.S. Pat. No. 3,619,680. Since wheel lock control systems, as well as other systems utilizing rotatable characteristics signals, are often provided on a small number of vehicles compared to the total production, it is common to provide a separate toothed disc as an interrupter, which must be bolted or otherwise suitably secured to a portion of the rotatable wheel assembly, or some portion of the rotating wheel assembly such as a wheel hub must be provided with such teeth whether or not a wheel lock control system is to be installed on the particular vehicle, or separate parts must be maintained for the same type of vehicle, depending on whether or not a magnetic field interrupter is required.

The structure embodying the invention herein disclosed and claimed permits the provision of a single wheel hub part for all like vehicles whether or not a magnetic field interrupter is required. It does not require the relatively expensive machining of gear-like teeth and does not require extensive installation such as that necessary when a separate toothed disc must be bolted in place. The end of the hub adjacent the bolts mounting the brake unit backing plate to the axle housing is normally formed to insure rotational clearance. It is in this area that a frusto-conical surface is provided on the wheel hub, with the smaller peripheral edge extending toward the hub end and terminating at a shoulder which is larger in its outer diameter than the smaller peripheral edge of the frusto-conical surface, and is preferably smaller in its outer diameter than the larger peripheral edge of the frusto-conical surface. Only when the vehicle of which the hub is a part is to have a rotational characteristics sensing mechanism as a part of a system such as a wheel lock control system is the magnetic field interrupter embodying the invention installed. This interrupter is an elastic garter member which has a plurality of teeth-like generally radial extensions and depressions substantially equally spaced circumferentially about it. The garter member is received on the hub so as to move rotatably with the hub adjacent the magnetic field probe head of the sensing mechanism. As each tooth-like projection or extension rotates immediately past the probe head, the magnetic field sensed by the probe is modified and suitable rotational characteristics signals are generated. While it is preferable to have a frusto-conical surface and a similar frusto-conical interrupter garter member, in some installations it may be more desirable to have the surface and garter member of a somewhat different peripheral configuration, such as a cylindrical configuration. The advantage of a frusto-conical arrangement, particularly with the end shoulder being of an outer diameter which is intermediate the diameters of the frusto-conical peripheral edges, includes the ease of installation of the garter member. It need only be positioned generally adjacent the end of the hub and moved axially so that it expands radially to the extent necessary to pass over the shoulder. It will then contract radially to grip the frusto-conical hub surface so that it is immediately locked in position with the smaller peripheral edge located at the shoulder over which the garter member has passed. The garter member may be made of any suitable magnetic field modifying material, such as spring steel, and must have sufficient tension so that in its contracting condition it grips the hub tightly to rotate therewith as the hub rotates. The garter member may be made in an accordian-like fashion with the teeth thereof having rounded edges or squared-off edges, depending upon the characteristics needed to generate signals in accordance with the sensing of the probe.

IN THE DRAWING

FIG. 1 is a cross-section view, with parts broken away, illustrating a mechanism embodying the invention.

FIG. 2 is a partial-section view taken in the direction of arrows 2—2 of FIG. 1 and showing an enlarged section of the interrupter and its relationship to the hub.

FIG. 3 shows a modified tooth-like construction of the interrupter.

In the mechanism shown in FIG. 1, a vehicle axle housing 10 is suitably fixed to the vehicle of which the mechanism is a part and has an axle 12 extending therethrough. The axle is arranged to drive or permit rotation of the hub 14 relative to the axle housing 10. If, for example, the wheel assembly 16, of which hub 14 is a part, is a driven wheel assembly, axle 12 is suitably connected to the hub 14 to transmit driving forces thereto. If the wheel assembly 16 is not a driving wheel, suitable bearings may be provided so that the hub 14 can rotate on axle 12. The wheel assembly 16 includes a wheel 18 and a brake drum 20 which are secured by suitable bolts 22 to the flange 24 of the hub. If another type of brake, such as a disc brake, is used, a suitable disc would be provided instead of the drum 20. The brake assembly for the wheel assembly 16 also includes a backing plate or support member 26 which is secured to the flange 28 of the axle housing 10 by suitable bolts 30. As is well known in the brake art, suitable brake shoes and actuating mechanisms for them are mounted on the backing plate 26 so as to engage the shoe linings with the friction surface 32 of the drum 20. However, since the particular brake arrangement utilized forms no part of the invention, the other brake elements have been omitted for simplicity and clarity.

A magnetic field probe 34 is suitably mounted on backing plate 26 by bracket 36. The probe or sensor has a head 38 which extends to a point radially outward from but immediately adjacent the hub inner end 40. The sensing mechanism's body 42 extends through an opening 44 of the backing plate 26 so as to be properly positioned. The terminals 46 on the other end of the sensing mechanism 34 provide suitable connections to a wheel lock control system, for example, so that signals generated in the sensing mechanism are transmitted thereto.

The hub inner end 40 has a shoulder 48 formed thereon adjacent the hub end surface 50. The shoulder extends radially outwardly so that the side thereof opposite hub end surface 50 is of somewhat greater diameter than the hub outer surface at this point. A smooth hub outer surface 52 is formed on the hub and in accordance with the preferred embodiment of the invention, is frusto-conical so that the smaller diameter edge 54 is adjacent the edge of shoulder 48 and is of lesser diameter than the shoulder. The larger diameter edge 56 of surface 52 is positioned axially toward the hub flange 24 from the hub shoulder 48 and is preferably of greater diameter than the maximum diameter of shoulder 48.

The magnetic field interrupter 58 is an elastic garter member having a plurality of tooth-like projections formed thereon extending generally axially of the garter member. In the preferred embodiment in which the hub surface 52 is frusto-conical, the interrupter 58 is also frusto-conical and has a smaller diameter edge 60 and a larger diameter edge 62. The tooth-like projections 64, hereinafter referred to as teeth, are formed as a part of the body of the garter member by a series of folds. Thus, the teeth 64 are separated by depressions 66 which extend radially inwardly. In the embodiment shown in FIGS. 1 and 2, the teeth 64 have rounded points or edges 68, as do the depressions 66. The rounded points or edges 70 formed by the depressions 66 extend radially inward. The rounded points or edges of each adjacent tooth and depression are joined by sides 72, which may be straight or flat surfaces. In the modification shown in FIG. 3, the teeth are squared-off at their radially outer ends 74 and a similar construction of the depressions 66 provides squared-off radially inwardly positioned points or edges 76.

When a magnetic field interrupter is required on the vehicle hub, the elastic garter member 58 is installed on the hub end 40 by moving it axially over shoulder 48, the elastic characteristics of the garter member permitting it to expand radially for this purpose. The garter member is then radially contracted due to its elasticity as soon as it clears the outer periphery of shoulder 48 and the garter member smaller diameter edge 60 positions itself at the inner edge of shoulder 48. The garter member has sufficient radial contractual elasticity to firmly grip the hub surface 52 so that the garter member will rotate with the hub. The depression points or edges 70 or 76 engage surfaces 52 for this purpose. If the hub and its garter member rotate, the teeth 64 pass immediately adjacent the probe head 38, modifying the magnetic field sensed by the probe and causing suitable rotational characteristics signals to be generated. Such signals, for example, may relate to the rotational velocity of the hub or its acceleration characterisitcs, or both. The signals may be used to measure vehicle speed in a speedometer arrangement, or to measure the specific changes in the rotational characteristics of the wheel assembly 16 during braking so as to control the wheel brake mechanism to maintain a desired amount of wheel braking without locking the wheels during very heavy braking.

What is claimed is:

1. In combination in a rotational characteristics signal generating mechanism,
    a rotatable wheel hub having a frusto-conical outer surface formed adjacent one end thereof and an integrally formed shoulder at the smaller diameter peripheral edge of said frusto-conical outer surface,
    a magnetic field probe mounted with the head thereof spaced radially outward of said frusto-conical outer surface, and an annular frusto-conical magnetic field interrupter formed as a multi-toothed garter member received on said frusto-conical outer surface of said hub immediately adjacent said magnetic field probe head with the interrupter smaller diameter peripheral edge thereof engaging said shoulder, said interrupter being sufficiently elastic to stretch over said shoulder during installation and retract radially to elastically grip said frusto-conical outer surface, said interrupter rotating with said hub and interrupting the magnetic field sensed by said probe in accordance with said rotation.

* * * * *